United States Patent [19]

Hassard et al.

[11] Patent Number: 5,690,564
[45] Date of Patent: Nov. 25, 1997

[54] FOOTBALL SUPPORT

[75] Inventors: Jamie Carmichael Hassard; Lawrence Edward Webb, both of Rugby, England

[73] Assignee: James Gilbert (Rugby Footballs) Ltd., Rugby, United Kingdom

[21] Appl. No.: 722,006
[22] PCT Filed: Feb. 8, 1996
[86] PCT No.: PCT/GB96/00276
§ 371 Date: Sep. 27, 1996
§ 102(e) Date: Sep. 27, 1996
[87] PCT Pub. No.: WO96/24408
PCT Pub. Date: Aug. 15, 1996

[30] Foreign Application Priority Data

Feb. 11, 1995 [GB] United Kingdom ............... 9502696

[51] Int. Cl.$^6$ .................................................. A63B 71/00
[52] U.S. Cl. ........................................................ 473/420
[58] Field of Search ................................. 473/420, 594

[56] References Cited

U.S. PATENT DOCUMENTS 3,924,856 12/1975 Dekan et al. .................. 473/594
4,011,611 3/1977 Lederman ................... 473/594 X
4,655,453 4/1987 Spiegal et al. ................ 473/494

FOREIGN PATENT DOCUMENTS 4189378   6/1979   Australia.
2096903  10/1982   United Kingdom.
2233907   1/1991   United Kingdom.
2268077   1/1994   United Kingdom.

Primary Examiner—William H. Grieb
Attorney, Agent, or Firm—Richard C. Litman

[57] ABSTRACT

A support device (10) for a football, particularly a rugby football (B), comprises a flexible bag (12) having a flat base (18) with sides (12a) formed from tapered sections of a woven nylon material (for example) defining a generally ogival shape. The bag (12) is filled with a malleable material, such as loose granular material, which does not occupy the whole of the maximum volume of the bag, such that a ball (B) may be placed on the bag which can be deformed and shaped to form a pocket (16) which serves to hold the ball in a chosen attitude for place kicking.

15 Claims, 3 Drawing Sheets

FOOTBALL SUPPORT

This invention relates to a support for a football for use during playing of the game or for display purposes. This invention also relates to apparatus for use in playing a game of football and to the game when played in combination with the apparatus.

In a game of football, particularly rugby football, where the ball is non-spherical and typically an ellipsoid, the ball does not lend itself to being balanced at a chosen angle or stood on or about an end for place kicking. In order to position a ball for place kicking, a player will either create a shallow recess in the playing field in order to receive an end of a ball, thereby to support the ball in a desired attitude until it is kicked or, alternatively and to the same end, a player may create a small mound of soil on which the ball can seated at a desired attitude in readiness for kicking.

More recently, rigid support devices made from a plastics material have been utilised. The former stated techniques of support are advantageous in that they allow a player to create the specific shape of support required in terms of desired height and ball attitude for the trajectory envisaged but are time consuming to create and inconsistent in the making due, for example, to soil characteristics or condition. The support devices do give the advantage of the provision of a consistent support device but are inflexible in the way in which the ball can be seated whereby adjustment of the attitude of the ball by the player is limited and possibly unstable.

In one aspect this invention provides a support for a football which is to be kicked from a stationary position on a playing surface, which support comprises a filler material contained within an outer skin and in combination forming a deformable, that is a malleable and/or pliable structure adapted to support said football at a desired and adjustable attitude above the playing surface.

According to a preferred feature of this invention said filler material may be a coherent single mass of a malleable substance, such as a clay-like material or viscous solid or liquid.

According to another preferred feature of this invention the said filler material may be particulate material such as a powder or a granular substance. Preferably the granular material used is sand.

According to a further preferred feature of this invention, the outer skin may comprise a bag preferably with a re-closable aperture. Preferably the outer skin is formed from a woven nylon material or other water and tear resistant material.

According to a still further feature of this invention, said support is generally -conical or ogival in form and having a planar base surface.

This invention thus provides, broadly, a pliable and/or malleable ball support which can be shaped so as to provide an adjustable support for use in place kicking a rugby football or the like.

Embodiments of this invention are described by way of examples only and with reference to the drawings, in which.

Figure 1:
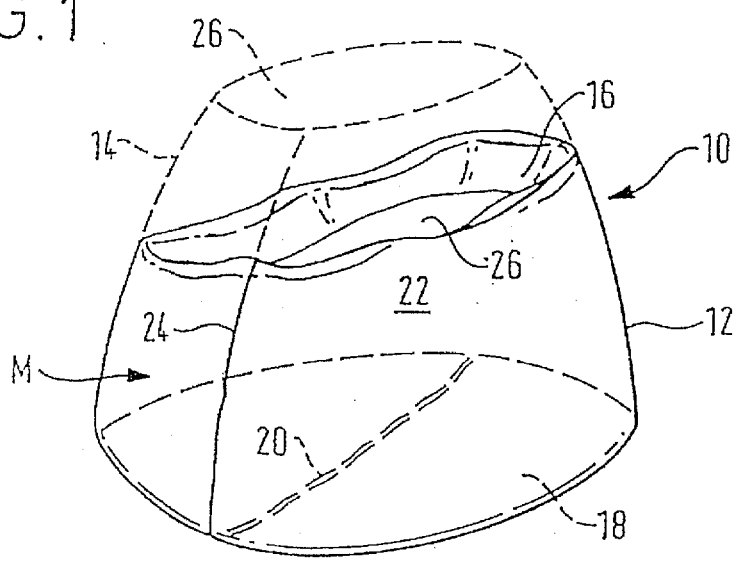
FIG. 1 shows in perspective view one embodiment of the ball support.
Figure 2:
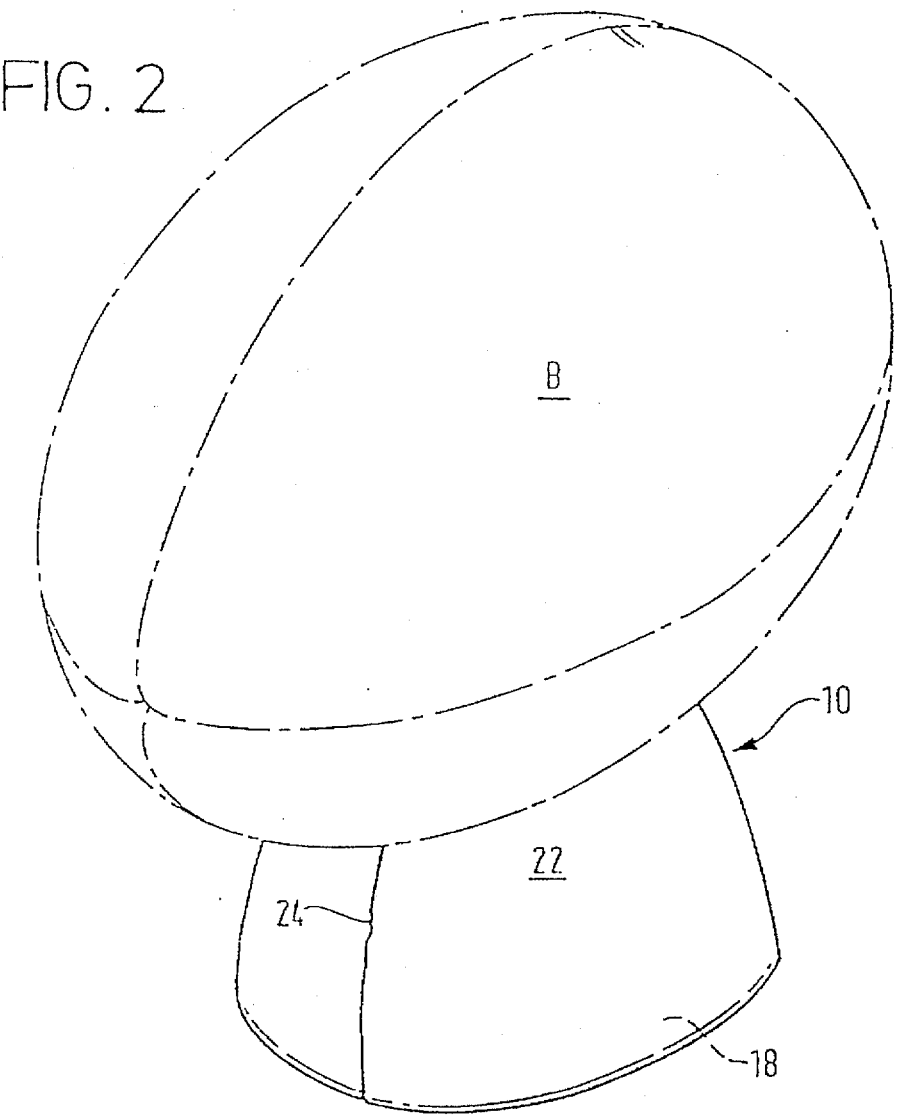
FIG. 2 shows in perspective view the support of FIG. 1 on which a rugby football is seated in a typical attitude for place kicking.

Referring firstly to FIGS. 1 and 2 of the drawings, a ball support device 10 comprises a bag 12 which is generally, but not strictly, of ogival or frusto-conical form and which forms an outer skin 14 containing a deformable filler material M such as a granular material, preferably sand. The bag 12 may contain a variety of materials which need not necessarily be granular. For example, some form of malleable mass in the nature of clay, a viscous liquid or solid such as a silicone gel or even water will suffice provided it can at least temporarily hold the form of the bag 12 into which it is shaped so as to provide a relatively stable but nevertheless adjustable support for a rugby football B or the like, during placement on the support for kicking. Of course, the device is equally suitable for use with American or Australian rules footballs.

It will be understood that a number of combinations of the bag material 12 and filler material M arc whilst still achieving the desired purpose. For example the bag 12 could be of a relatively stiff self-supporting fabric containing an easily deformable material 12, water as example, or the bag 12 could be of a thinner more pliable material, such as a plastic film, containing less easily deformable material in the nature of soft clay as example. Within the ambit of this invention suitable combinations can easily be deduced by those skilled in the art. It has, however, been found, quite surprisingly, that a combination of a woven nylon fabric for the bag 12 and common sand for the filler material M offers excellent results.

The support device should be such that, and in accordance with this invention, the ball can be orientated to the required attitude and then pressed into the support to deform the upper part into compliance with the ball curvature to retain the attitude of the ball, whilst still allowing fine adjustment, all without undue pressure force being required.

A modification provides lot the support to be easily deformable in one physical state of the filler M and less easily or non-deformable in a second physical state. The support can then be "personalised" by a player and fixed in a chosen form and in the second state. This can be achieve by settable filler material or using heat to achieve the change in deformable state.

The outer bag or skin may be made from any material which is flexible enough to allow the interior filling material to emulate the physical consistency of wet sand, and the interior filler material may be of any material that will mould or form itself to the shape of an object placed upon it.

In order to fulfil the requirements of the support, best results are obtained if the bag is only partially filled, in relation to the maximum expanded volume, with the fill substance so that "free" material of the bag at the top end of the device assists in provided a suitable recess or shallow pocket 16 in which the cooperating curved surface of a ball is received.

The bag in the embodiment of FIGS. 1 and 2 comprises a flat base panel 18 which is formed with a reclosable opening 20, a continuous side wall 22 formed with a closing seam 24 and a top panel 26. The material from which these panels are formed can be a woven nylon material but in any event does need to be flexible. The top and bottom panels are stitched to the side wall panel. The bag contains a sand filler material which occupies about two-thirds or thereabouts of the total expaned volume of the bag. In one form the base panel 18 is 12 cm. in diameter, the top panel 26 is 9 cm. in diameter and the overall full expanded height of the bag is 9 cm.

If desired the top wall or bottom panel of the bag is provided with a non-slip surface to enhance the grip between the bag and the ground and/or the bag and a ball B. Formations may be included on the base 18 to facilitate grip.

Figure 3:
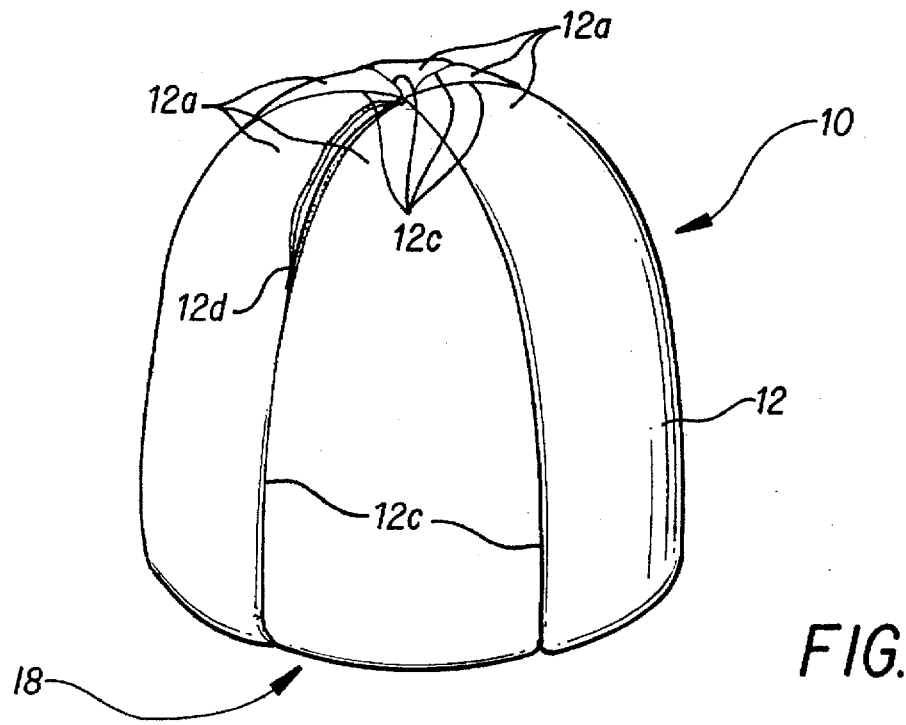
FIG. 3 shows in perspective view a second embodiment.
Figure 4:
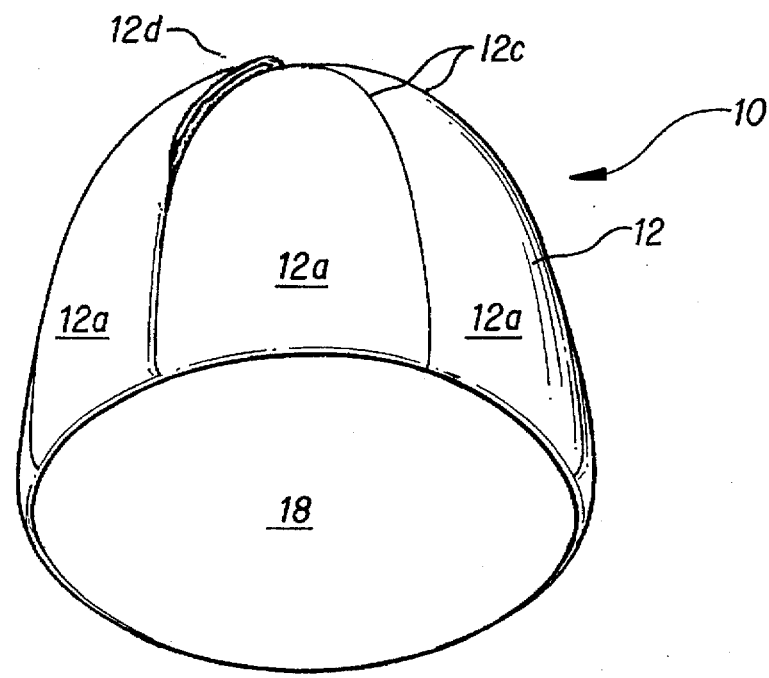
FIG. 4 shows the embodiment of FIG. 3 from below.
Figure 5:
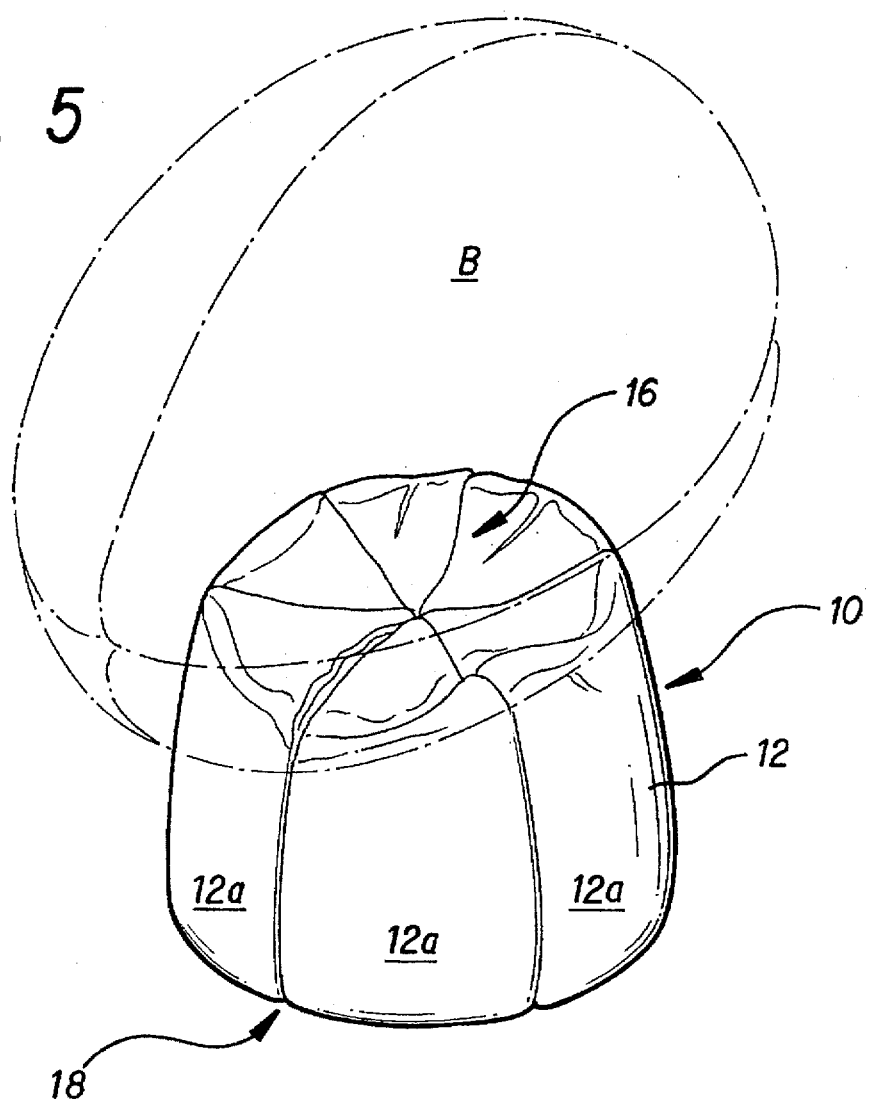
FIG. 5 shows the embodiment of FIG. 3 with a rugby football seated thereon.

A second embodiment of support according to this invention is shown in FIGS. 3 to 5 of the accompanying drawings and generally the way in which the support is used and the materials for the bag 12 and filler M are similar. In this construction, as shown, the support comprises the bag 12 which is constructed to have a generally ogival form and made from six separate sections of material 12a. The sections are stitched together, or otherwise joined, along seams 12c and furthermore joined to a generally circular base 18. The seams 12c are turned inwardly before stitching and part of the length 12d of one of the seams 12c is left unstitched during assembly of the bag, this then enabling the filler material to be inserted after which the part 12d is stitched or otherwise closed-off conveniently externally. This construction has advantages in that an additional seam, such as 20 in FIG. 1, need not be provided and the quantity of filler material can be easily varied at any stage. In a modification the part 12d is a reclosable seam whereby an individual can adjust the amount of filler according to his particular preferences. An additional advantage of this construction is that it enables the support to be transported without the filler material which can then be introduced as required, this avoiding heavy transportation costs.

FIG. 5 shows the second embodiment of support in use with a rugby ball B illustrated in outline, the drawings showing the way in which the upper parts of the support are deformed to form pocket 16 by the contacting surfaces of the ball which can then be retained in a selected attitude.

Figure 6:
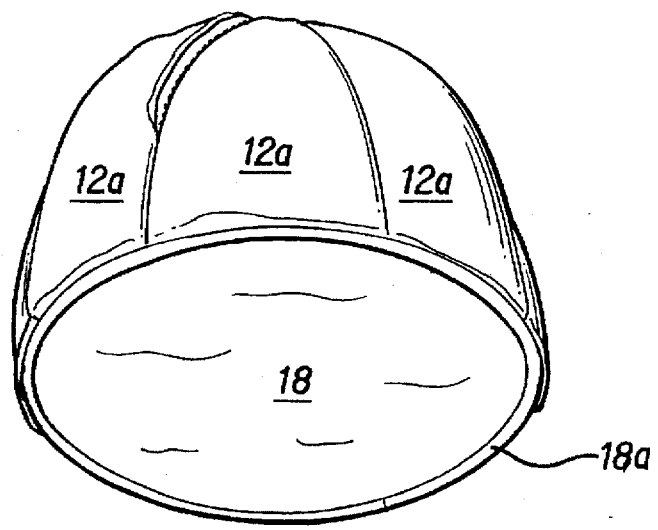
FIG. 6 shows in perspective view a third embodiment.

FIG. 6 of the accompanying drawings shows an embodiment which is generally similar to that disclosed in FIGS. 3 to 5 except that the height of the support is less and in addition the juncture between the base 18 and the side panels 12a is augmented by means of a circular section plastic piping material which adds to the strength of the structure. This plastic piping is also semi-rigid and serves to maintain a flatter base and a circular plan form therefor.

Although this invention is primarily intended to support a football for the purposes of kicking, it will be apparent that the device is also useful for displaying footballs, for example at a point of sale or an exhibition, this being difficult to achieve without using specialised support stands to prevent rolling motion of the balls on display. This invention also embraces the combination of a football with the support device.

This invention further provides an apparatus for use in playing a game of the kind wherein a ball is to placed on a point in a playing area in a chosen attitude and thereafter projected through the air from said point by the action of a player's foot towards a chosen target, which game includes the use of an apparatus comprising the ball support as hereinbefore described and on which the ball is seated prior to being impacted by the player's foot.

We claim:

1. A football support comprising a filler material contained within an outer skin forming a deformable closed bag including a flat base portion having a periphery connected with an upstanding wall portion tapering in a direction away from said flat base portion.

2. The football support according to claim 1 wherein said filler material is a coherent mass of a malleable material.

3. The football support according to claim 1 wherein said filler material is granular.

4. The football support according to claim 3 wherein said filler material comprises sand.

5. The football support according to claim 1 wherein said outer skin includes a reclosable aperture through which said filler material is introduced.

6. The football support according to claim 1 wherein said outer skin is formed from a water and tear resistant material.

7. The football support according to claim 6 wherein said outer skin includes nylon material.

8. The football support according to claim 1 wherein said outer skin is generally conical in form.

9. The football support according to claim 1 wherein said filler material is powdered.

10. The football support according to claim 1 wherein said upstanding wall portion is generally ogival in form.

11. The football support according to claim 10 wherein said upstanding wall portion is formed from individual sections shaped and joined together to form an ogival shape.

12. The football support according to claim 1 wherein said filler material occupies between 50 and 90% of the maximum volume of said outer skin.

13. The football support according to claim 1 wherein said filler material comprises a viscous material.

14. The football support according to claim 13 wherein said viscous material comprises a gel.

15. The football support according to claim 14 wherein said gel comprises a silicone gel.

* * * * *